United States Patent [19]
Zetts

[11] Patent Number: 5,404,458
[45] Date of Patent: Apr. 4, 1995

[54] RECOGNIZING THE CESSATION OF MOTION OF A POINTING DEVICE ON A DISPLAY BY COMPARING A GROUP OF SIGNALS TO AN ANCHOR POINT

[75] Inventor: John M. Zetts, Falls Church, Va.

[73] Assignee: International Business Machines Corporation, Armonk, N.Y.

[21] Appl. No.: 201,147

[22] Filed: Feb. 24, 1994

Related U.S. Application Data

[63] Continuation of Ser. No. 774,488, Oct. 10, 1991, abandoned.

[51] Int. Cl.$^6$ .............................................. G06F 15/02
[52] U.S. Cl. .................................. 395/275; 364/927.6; 364/927.64; 364/929.12; 364/DIG. 2; 345/173
[58] Field of Search ............... 395/140, 141, 142, 143, 395/147, 162; 345/145, 156, 157, 158, 159, 160, 161, 162, 163, 164, 167, 173, 179, 180; 364/927.5, 927.61, 929.12, 929.3

[56] References Cited

U.S. PATENT DOCUMENTS

| | | | |
|---|---|---|---|
| 4,334,266 | 6/1982 | Mirbach | 364/167 |
| 4,409,836 | 10/1983 | Comroe et al. | 73/504 |
| 4,587,630 | 5/1986 | Straton et al. | 364/900 |
| 4,760,386 | 7/1988 | Heath et al. | 340/709 |
| 4,886,941 | 12/1989 | Davis et al. | 340/710 |
| 4,899,138 | 2/1990 | Araki et al. | 340/712 |
| 4,903,012 | 2/1990 | Ohuchi | 340/709 |
| 5,025,411 | 6/1991 | Tallman et al. | 364/900 |
| 5,027,109 | 6/1991 | Donovan et al. | 340/706 |
| 5,157,384 | 10/1992 | Greanias et al. | 340/706 |
| 5,179,368 | 1/1993 | Lippincott | 340/708 |
| 5,187,467 | 2/1993 | Myers | 340/706 |
| 5,189,403 | 2/1993 | Franz et al. | 340/706 |

FOREIGN PATENT DOCUMENTS

| | | | |
|---|---|---|---|
| 63-311426 | 4/1987 | Japan | . |
| 62-080724 | 12/1988 | Japan | . |

*Primary Examiner*—Thomas C. Lee
*Assistant Examiner*—Moustafa Mohamed Meky
*Attorney, Agent, or Firm*—George E. Grosser; Joseph C. Redmond, Jr.

[57] ABSTRACT

A method and apparatus for efficiently distinguishing between different types of input signals simulated by a pointing device coupled to a multi-tasking computer system. The pointing device may be a stylus, finger or other device that moves across the surface of a touch screen or the like to generate positional information. Depending on the response of a delay timer, the motion of the pointing device is recognized by software application programs as input information either from a mouse or from a gesture or a handwriting input mode. If motion cessation across the screen is detected with a predetermined time-delay period, the system accepts the input information in a mouse-emulating mode. If motion is detected within the predetermined time-delay period, the timer is reset. Thus, the system overhead associated with managing the timer can be reduced because the timer is periodically reset and need not be reset after each movement of the pointing device as in the prior art. The periodic resetting can be based on intervals of n points generated by a moving pointing device, or n real-time units relative to a given point generated by the pointing device.

16 Claims, 11 Drawing Sheets

| FIG. 2A |
|---------|
| FIG. 2B |

RECOGNIZING THE CESSATION OF MOTION OF A POINTING DEVICE ON A DISPLAY BY COMPARING A GROUP OF SIGNALS TO AN ANCHOR POINT

This application is a continuation of U.S. patent application Ser. No. 07/774,488, filed Oct. 10, 1991, now abandoned.

TECHNICAL FIELD

This invention generally relates to input devices for a data processing system and, more particularly, a method and apparatus for reducing system overhead associated with distinguishing between input signals generated by different types of pointing devices. The invention has particular application in a multi-tasking computer system in which a single task is dedicated to controlling a timer used to distinguish between the input signals.

BACKGROUND ART

The use of a touch input device disposed over the viewing surface of a computer display to provide a "user friendly" means for the control of a data processing system is well known in the art. U.S. Pat. No. 5,025,411 to Tallman et al. discloses a typical input device in the form of a touch screen used to control the operation of a digital oscilloscope. U.S. Pat. No. 4,587,630 to Straton et al. discloses a programmable touch screen emulating a keyboard input device. U.S. Pat. No. 4,903,012 to Ohuchi discloses a touch screen for calibrating the coordinates of a computer system. Such devices are designed to allow an unsophisticated user to perform desired tasks on a computer system without extensive training. Human factor studies have shown that an input device which allows the user to input data directly on the computer display achieves greatest immediacy and accuracy between man and machine.

In current graphical user interfaces developed to aid man-machine interaction, there are many items, such as menu selections, icons or windows, which a user can most easily select by using a mouse or a finger. U.S. Pat. No. 4,886,941 to Davis et al. and Japanese Publications Nos. 62-80724 and 63-311426 describe prior art systems employing mouse-pointing devices as input devices for data processing systems. Some advanced softward applications allow a user to input complex control signals with a finger. U.S. Pat. No. 4,899,138 to Araki et al., for example, discloses a touch panel for providing control signals in accordance with the manner in which a finger touches the panel within a predetermined period of time (i.e., making a gesture).

A stylus has proven to be more effective in inputting information on a touch sensitive input device because of its greater precision. It is more convenient to utilize a touch input system which allows both a stylus and a finger to operate as input devices. One such system is described in commonly assigned U.S. Pat. No. 4,686,332 to Greanias et al., entitled "Combined Finger Touch and Stylus Detection System for Use on the Viewing Surface of a Visual Display Device," and which is hereby expressly incorporated herein by reference.

In a touch input device (e.g., a touch workpad) for a data processing system, where a touch sensor is disposed over a viewing surface of a display, input signals generated from a pointing device, such as a stylus or finger, can be categorized either as a mouse input signal or as a gesture or handwriting input signal. Where such input signals are intended to emulate the behavior of a mouse and represent commands, such as mouse button down and mouse button up, the stylus or finger is respectively touched down and lifted off the surface. Where the input device allows the user to use a stylus and touch sensor to simulate pen and paper to create a handwriting input signal, alphanumeric characters can be entered into an appropriate application program. Where the input signal is part of a gesture, a series of such input signals resembling a geometric figure, such as a circle, a right-hand or a left-hand arrow, are indicative of an action to be taken by the computer system. As all three types of input signals may be emulated by the use of a stylus or finger as a touch input device, it would be advantageous to design a stylus- or finger-based operating system such that all three types of input signals may be simultaneously entered anywhere on the display.

In order to utilize all three types of input signals, they must be distinguished by the data processing system. One method of differentiating between the types of input signals is by timing. If the user, after initiating contact between a pointing device and the touch sensor, moves the pointing device to a desired position and stops motion for a predetermined time period without losing contact between the device and the touch sensor (hereinafter referred to as "lift-off"), the operating system will recognize an input signal at the desired position as a mouse command. For example, if the user stops moving the pointing device at a given position for 200 milliseconds, a mouse command at the given position is recognized. If, on the other hand, the user does not stop at any given position for the specified time delay period and instead lifts off the touch sensor, the input signals are selected as candidates for character or gesture recognition instead of mouse commands.

To detect the cessation of motion at a desired position, the operating system repeatedly resets a delay software timer each time a position point identified by an input signal generated by the pointing device is sufficiently offset from a previous position point. Repeatedly resetting the timer in this manner creates a large amount of processing overhead when the cessation detection is required in a multi-tasking system.

A multi-tasking computer system creates the illusion of concurrently running a plurality of computer processes, also known as jobs, tasks or threads. To create this illusion, an operating system switches a single processor between multiple threads. A timer thread is dedicated to managing the software timer. The timer thread cannot reset the timer until the processor saves all computations made while executing the current thread and switches back to the timer thread. As a result, a large amount of processing time is required to repeatedly reset the above-described timer.

SUMMARY OF THE INVENTION

It is an object of this invention to reduce the overhead associated with a delay timer which is reset each time an input signal, representing a point on a workpad, generated by a pointing device is sufficiently spaced from a previous input signal.

It is another object of this invention to maintain the accuracy of measurement of a period of cessation of a pointing device's motion while a timer is reset on every nth position point and the pointing device has stopped sometime between timer resets.

It is a further object of the invention to more efficiently identify an input signal generated by a pointing device in a multi-tasking computer system that dedicates a task or thread to managing a timer used to distinguish between types of input signals generated by a pointing device.

It is also an object of the invention to reduce in a data processing system the overhead associated with a delay timer by resetting the timer periodically when a point is generated from a pointing device within a given period of time starting from the time an initial point is generated.

These and other objects and features of the invention are accomplished by a method and apparatus which manage in the following manner a delay timer in an operating system of a computer receiving input from a pointing device. At touch-down time, the identity of the pointing device is established, and the rate at which points (represented by the input signals) are generated by the pointing device is determined. A timer reset divide rate is calculated such that the delay timer is reset on every nth point generated, even though motion of the pointing device may have been detected on the current point. Points are collected as the pointing device is moved across a touch-sensitive computer display. In the alternative, points are collected from a pointing device that causes a cursor to move across a display screen without requiring the screen to be touched by the pointing device, e.g., mouse, joystick, etc. In response to a determination that motion has occurred within the previous n points generated from the pointing device, the timer is reset with a predetermined time-delay period. If motion has occurred within the previous n points, but has ceased during the generation of the last several points, the timer is reset with an additional amount of time attributable to such last several points in order to maintain the accuracy of the timing. If it is determined that the motion of the pointing device ceased for the predetermined time-delay period, e.g., 200 milliseconds, an action is performed by the computer system. In the preferred embodiment, the action is a mouse command, such as a mouse button down or mouse button up, that is generated at the point where motion ceased. If the pointing device does not stop at any position for the predetermined time-delay period, but instead lifts off, the set of points generated by the pointing device is sent to a character- or gesture-recognition unit as candidates for character or gesture recognition.

In another embodiment of the invention a given point is generated from the pointing device and marked as a reference point. Each subsequently generated point is monitored with respect to a time period relative to the time the reference point was generated. When subsequent point is generated at a time period greater than a given time period, the delay timer is reset as in the embodiment above.

BRIEF DESCRIPTION OF THE DRAWINGS

The above objects, features and improvements will be better understood with reference to the following drawing figures.

DETAILED DESCRIPTION OF THE INVENTION

Figure 1:
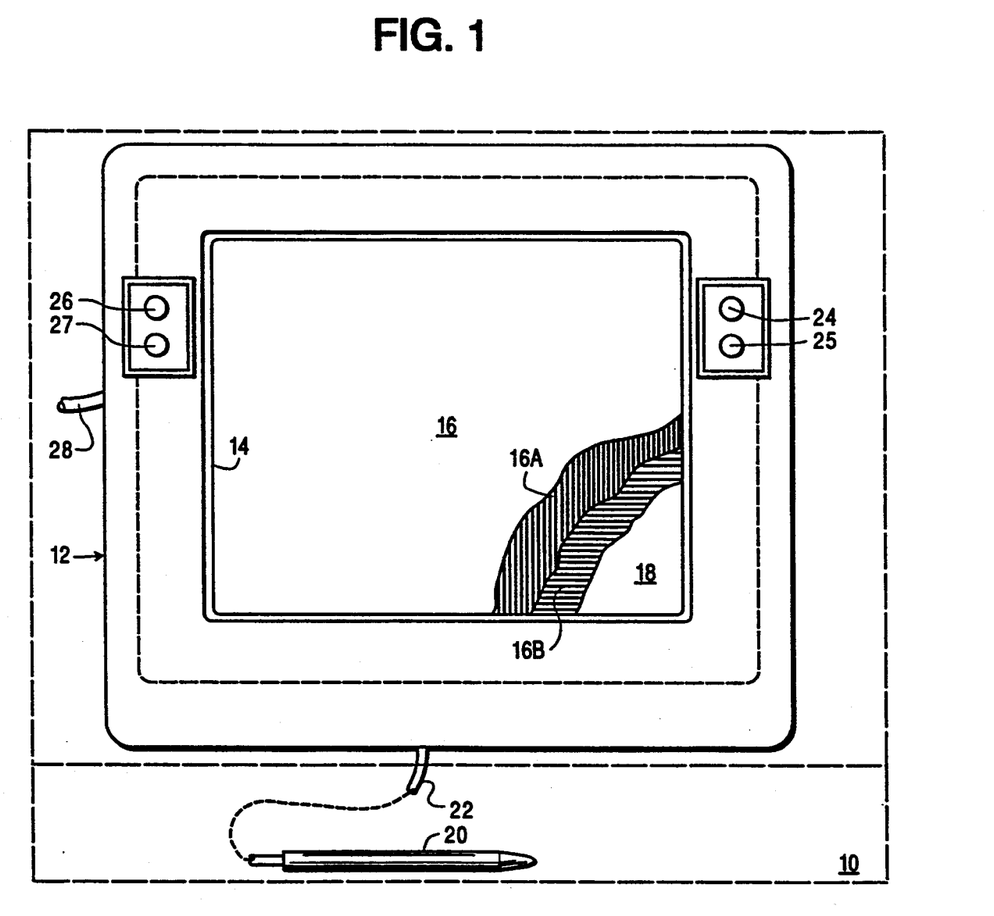
FIG. 1 shows the front view of an overlay unit used for the detection of finger touch and stylus position. The unit is disposed over a flat panel display to form what is known as a "touch workpad."

FIG. 1 shows a touch workpad substantially similar to that described in co-pending application No. 07/351,227 to Arbeitman, et al., entitled "Flat Touch Screen Workpad for a Data Processing System," filed May 15, 1989, which is hereby expressly incorporated herein by reference. The workpad 10 comprises a housing 12 having a rectangular recessed window 14 which surrounds the edges of a rectangular touch overlay 16. The touch overlay 16 is transparent and is disposed on a liquid crystal display (LCD) 18. The overlay 16 consists of a laminate structure including several plastic substrate layers laminated together by means of adhesive layers. The overlay 16 also includes a first plurality of transparent X conductors 16A disposed in the vertical direction and a second plurality of transparent Y conductors 16B disposed in the horizontal direction. Several of the conductors in both the vertical and horizontal directions are positioned beyond the recessed window 14 to allow more accurate determination of the location of the stylus 20 or a finger on or near the overlay 16 at the edges of the display window 14.

The stylus 20 is connected to the touch workpad via cable 22. The stylus 20 acts as an antenna to pick up the signals radiated by the overlay 16, and provides much greater resolution than can be provided by a finger touch. Also on the bezel of the housing are four button switches 24–27 which can be used to change the mode in which the data from the workpad 10 is received. Workpad cable 28 connects the workpad 10 to the computer with which the user is communicating. The workpad cable 28 provides power to the workpad 10 as well as display signals to operate the LCD 18 and also touch signals to operate the overlay in both finger touch and stylus modes. In addition, the cable 28 is also the conduit to the computer for the measurement of the signal strength received by the stylus 20 and of the frequency change due to changes in capacitance of a finger touch.

Figures 2, 2A:
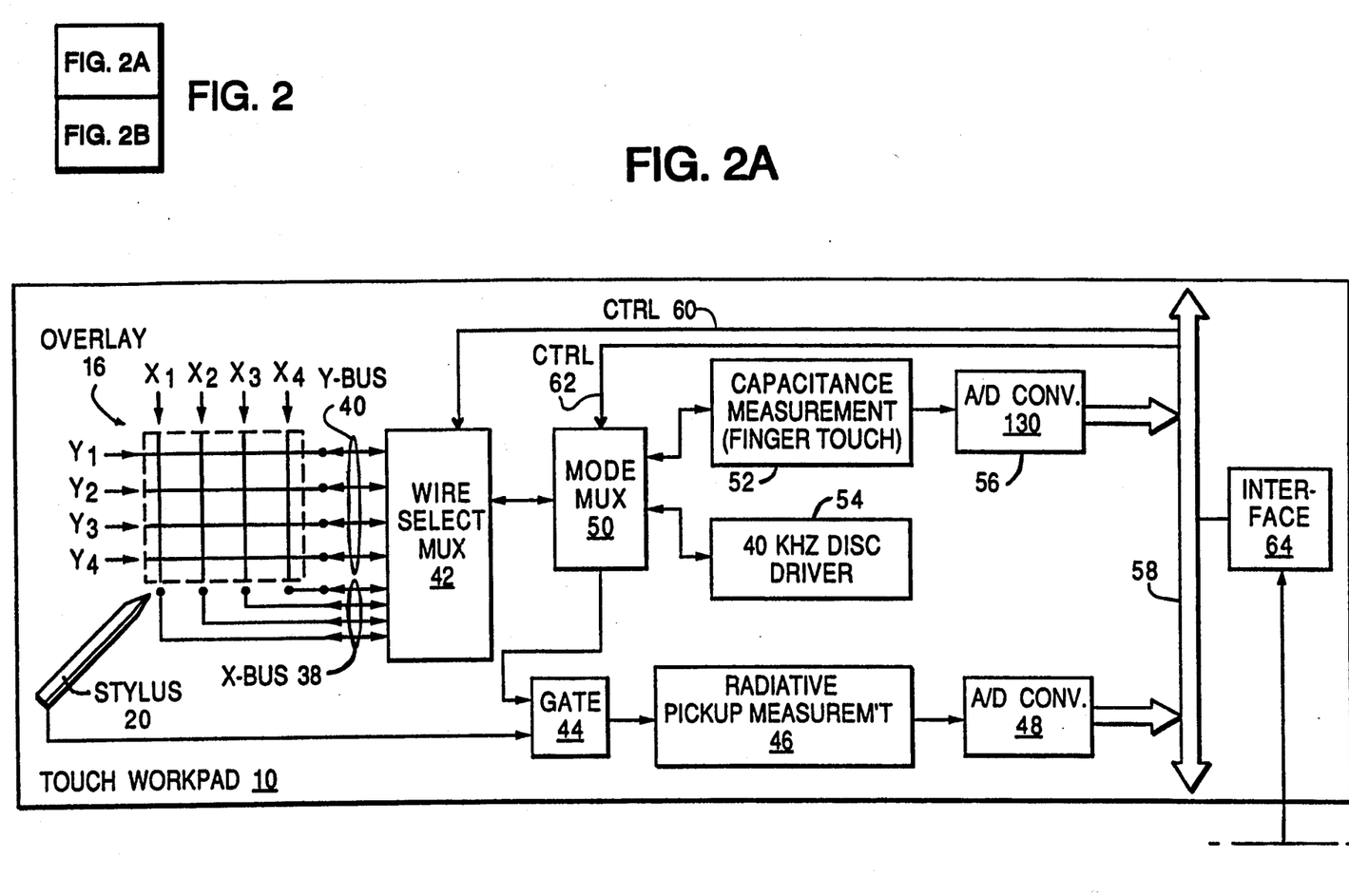
FIG. 2 is an architectural diagram of the combined finger touch and stylus detection system.
Figure 2B:
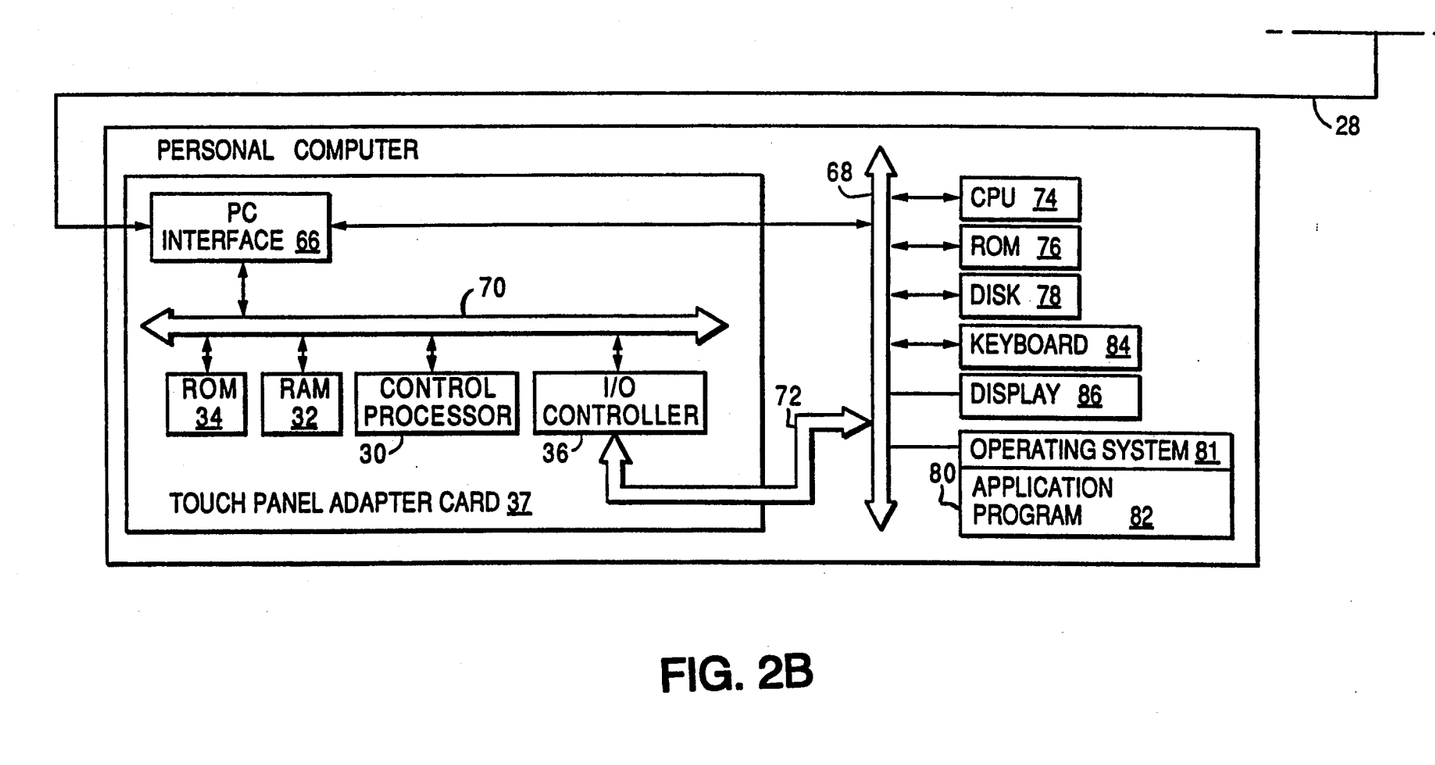

FIG. 2 shows an architectural diagram of the finger touch and stylus detection system which is similar to that disclosed in FIG. 9 of U.S. Pat. No. 4,686,332. The touch control processor 30, random access memory 32, read only memory and the I/O controller 36 are on a touch panel adapter card 37 in a personal computer, while the rest of the touch electronics are integrated in the touch workpad 10. As discussed in connection with FIG. 1, the touch workpad 10 communicates with the personal computer and touch panel adapter card 37 via-the workpad cable 28. The vertical X conductors and the horizontal Y conductors are connected through the X bus 38 and the Y bus 40, respectively, to the wire selection multiplexer 42. The radiative pickup stylus 20 is connected through the gate 44 to the radiative pickup measurement device 46. The wire selection multiplexer 42 is connected through the mode multiplexer 50 to the capacitance measurement device 52 which is used for capacitance finger touch detection. The wire selection multiplexer 42 is also connected through the mode multiplexer 50 to the 40 kHz oscillator driver 54 which is used to drive the X bus 38 and the Y bus 40 for the stylus detection operation. The mode multiplexer 50 also provides an enabling input to the gate 44 to selectively connect the output of the stylus 20 to the radiative pickup measurement device 46 for stylus detection operations. The output of the capacitance measurement device 52 is connected through the analog-to-digital converter 56 to the workpad bus 58. The output of the radiative pickup measurement device 46 is connected through the analog-to-digital converter 48 to the bus 58. The control input 60 of the wire selection multiplexer 42 is connected to the bus 58. The control input 62 of the mode multiplexer 50 also is connected to the bus 58.

The workpad bus 58 is connected via workpad interface 64 to the workpad cable 28 which is connected to interface 66 in the touch panel adapter card 37 of the personal computer (PC). The PC interface 66 communicates with the main system bus 68 and with the adapter card 70. The I/O controller 36 has an I/O bus 72 which is connected to the main bus 68 of the PC. The I/O controller 36 is also connected to adapter card bus 70. The adapter bus 70 also interconnects the control processor 30 with the read only memory (ROM) 34 and the random access memory (RAM) 32. The personal computer includes standard devices known in the art such as a CPU 74, ROM 76, disk storage 78, a memory 80 which stores operating system 81 and application programs 82, a standard keyboard 84, and a standard display 86. The standard display 86 is typically a cathode ray tube (CRT), and in the preferred embodiment the display 86 is in addition to the liquid crystal display (LCD) 18 of workpad 10.

The wire selection multiplexer 42 and the mode multiplexer 50 connect selected patterns of a plurality of the horizontal and vertical conductors in the overlay 16 to either the capacitance measurement device 52 or the 40 kHz oscillator driver 54, in response to control signals applied over the control inputs 60 and 62 from the bus 58 by the control processor 30. During finger touch operations, the capacitance measuring device 52 has its input coupled through the mode multiplexer 50 and the wire selection multiplexer 42 to selected single conductors in the horizontal and vertical conductor array in the overlay 16 in response to control signals from the control processor 30. The output of the capacitance measurement device 52 is converted to digital values by the A/D converter 56 and is supplied over the bus 58 to the control processor 30. The control processor 30 executes a sequence of stored program instructions to detect the horizontal array conductor pair and the vertical array conductor pair in the overlay 16 which are both being touched by the operator's finger.

The finger touch and stylus sensing modes operate independently of one another, the detection system cycling between the two modes until a finger touch or stylus is detected.

Commonly assigned, co-pending application No. 07/344,879, entitled "Advanced User Interface," filed Apr. 28, 1989, which is hereby expressly incorporated herein by reference, describes an operating system extension which allows alternative forms of input to be handled by conventional software applications which were not written to understand such alternative forms of input. For example, conventional applications are written to accept only keyboard and mouse input signals. A user could use the Advanced User Interface (AUI) to utilize a touch sensor without modifying any of the software application code. In accordance with the present invention, AUI is stored in RAM 80 with the operating system 81 and application programs 82. In a preferred embodiment, this invention improves AUI by allowing it more efficiently to distinguish between mouse commands and gesture or character data.

Figure 3:
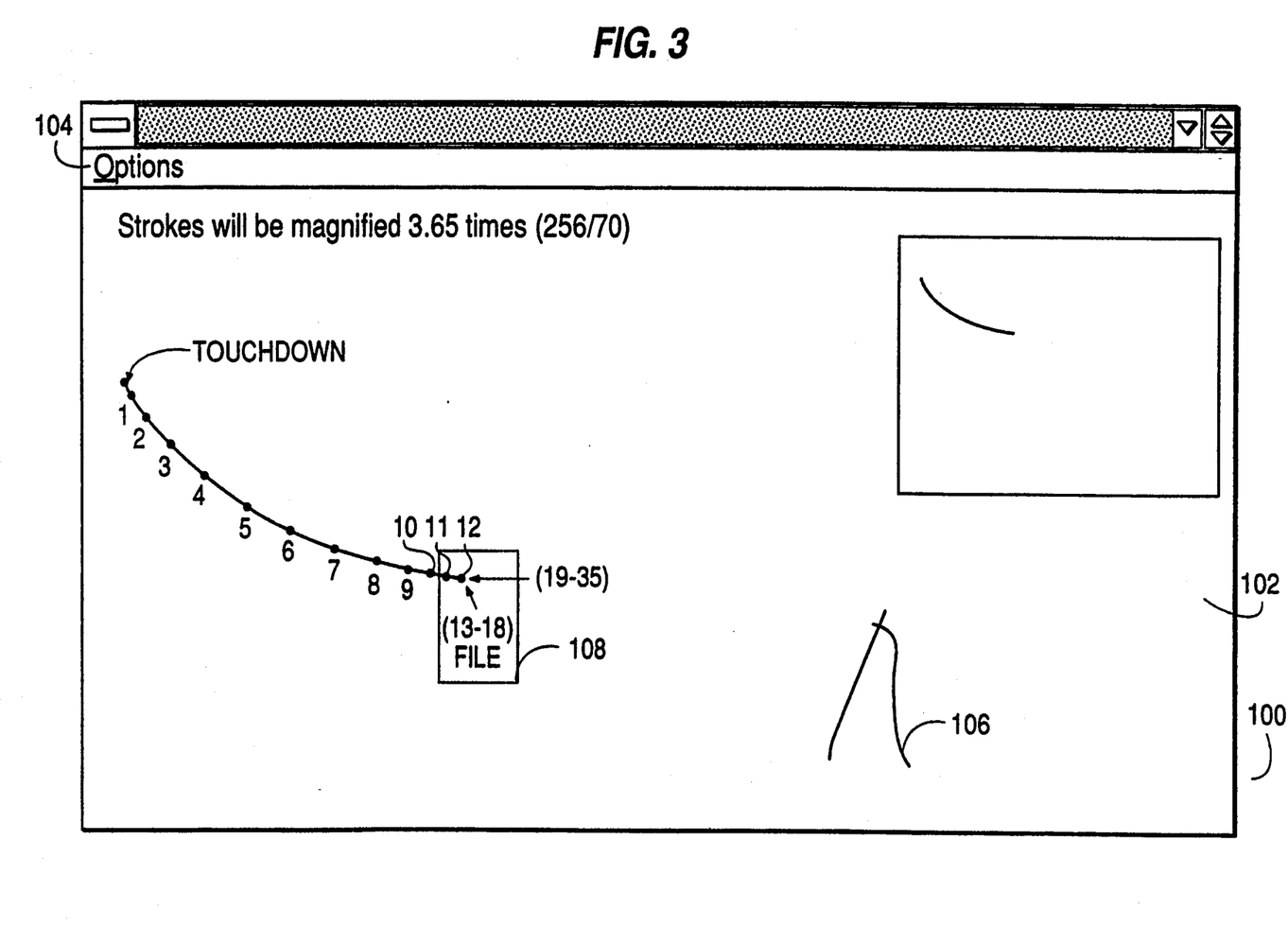
FIG. 3 is a representation of a window displayed on the touch workpad in FIG. 1 and illustrating a stroke made by a pointing device that has been recognized as a mouse command.

FIG. 3 is a representation of the touch workpad of FIG. 1 showing an opened software application window 100. The application is called "MAG.EXE." The work space area 102 is a typical feature of a window and is the area where most data for input of the application is generated. The action bar 104 contains a single selectable menu item, "options." If the user touches down with the pointing device (e.g., stylus, finger, etc.) on the "options" menu item, a pulldown menu will appear to allow him to select one of many available options.

The window also depicts the inked trail of a set of points representing a gesture 106 made by a pointing device. In this case, the gesture 106 is an "up arrow" which is one of many gestures which is recognizable by the AUI and which a user can use to cause the computer system to take one of many possible actions. One possible meaning for the "up arrow" gesture, when input in the work space area 102 of window 100, would be to enlarge or to maximize the window 100.

Also depicted in FIG. 3 is a long line 107 representing another trail of input points generated by a pointing device. For this series of points after touchdown, the user moved twelve points and then ceased further movement. As shown in FIG. 3, the user did not move the pointing device from point 12 to point 35. Thus, a timeout was created and program execution transferred to mouse emulation mode. Now an application command, such as a "file" command 108, could be activated by recognizing the series of points as a "file" command generated by a mouse-pointing device and sent to the application program.

The present invention includes a computer module within the stylus or finger-based operating system extension (AUI) to differentiate between touch input signals intended to emulate a mouse command, such as a mouse button down, mouse move, or a mouse button up, and those touch input signals which are to be considered a gesture or character. This differentiation is done by using a time delay to differentiate between the two types of touch input signals. The AUI allows the user to touch the screen and move to the desired position before the application is notified of the command by placing all the points received from the touch sensor in a stroke buffer. The points stored in the stroke buffer are hereinafter referred to as "a stroke." Once the user reaches the desired position and stops moving for the set time delay, a mouse command is generated at the point at which the user has stopped. Since AUI recognizes the timeout as mouse emulation, rather than as a gesture command, the stroke buffer is not used and the application is passed a mouse command; in the preferred embodiment the command would be a mouse button down message. For example, if the user stops moving the pointing device at a desired position for 200 milliseconds, a mouse command, such as a mouse down button command, at the desired position is communicated to the application program. However, if the user starts to move the device again before the end of the set period of time, the command is not generated until the user once again stops (without lifting off) and pauses for the period of time delay. The time delay is typically defined in milliseconds (ms) and may be varied depending upon the screen area with which the user is interacting. The time delay may be specified by the user or may be altered by the application program which is utilizing the touch input signal.

If, on the other hand, the user does not stop at a particular point for the specified time delay period and instead lifts off the touch screen, the AUI selects the set of input points generated by the pointing device (the stroke) as candidate points for character or gesture recognition. In other words, the time delay provides a window in time in which gestures can be made. During this time, the AUI will only allow gestures to be made. If the user waits for the time delay period before lifting off, the points generated by the pointing device will not be candidates for a gesture. The stopping point coordinates (i.e., coordinates corresponding to the last point generated by the pointing device prior to detection of motion cessation) are then used for a mouse command. If the user lifts the pointing device before the time delay period expires, an attempt will be made to recognize the set of generated points as a gesture or character. If the points are not so recognized, however, the normal mouse emulation sequence will be generated. If the points are recognized, the AUI sends the appropriate commands to the appropriate application program.

Figure 4:
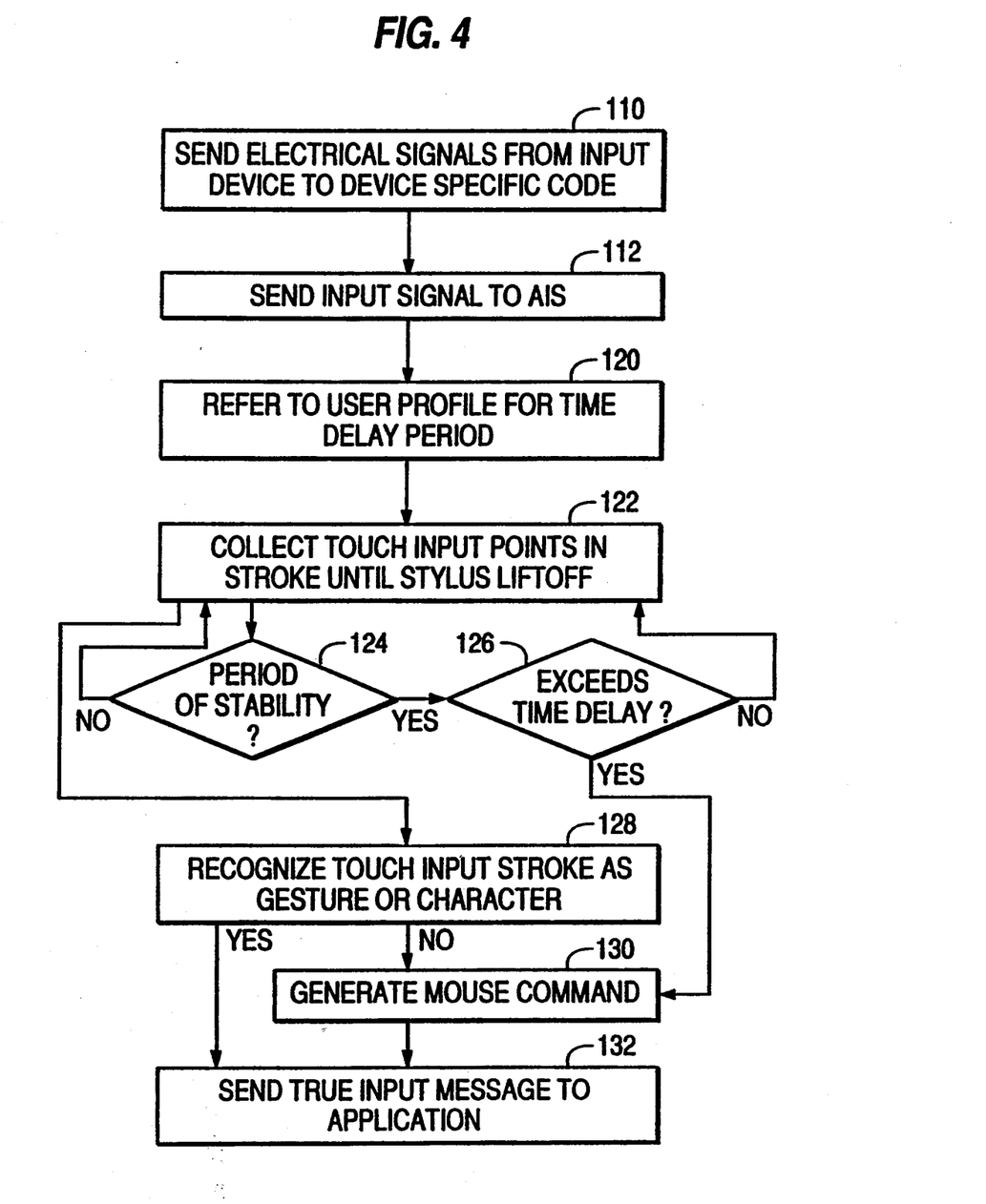
FIG. 4 is a flow diagram illustrating the operation of the present invention to distinguish between stroke input signals intended to produce mouse commands, and stroke input signals intended to produce gesture or handwriting events.

The recognition of a circle gesture made by a pointing device on the face of the touch overlay 16 is described below with reference to FIG. 4.

A user, having determined that he wishes to invoke a software utility by making a gesture with a pointing device, draws a circle on the face of the touch sensor 16 and lifts the device off before the end of the set time delay. The touch sensor 16 generates a series of interrupts to a device driver for the touch workpad at 110 which passes a set of input signals to the AUI corresponding to the set of points in the circle at 112.

When the AUI discovers the first touch input point (i.e., a touch-down of the pointing device on the touch sensor 16), it looks up the time delay period selected by the user or programmer at 120. At 122, the touch input points generated by the pointing device are collected in a stroke buffer until the stylus lift-off event is detected. At 124, as the touch input points are received by the AUI. A delay timer is reset every nth point to determine the period of stability or cessation of pointing device movement initiated by the user pausing on the touch sensor at 126. If the user moves the pointing device before the time delay period has expired, the AUI continues to receive the touch input points in the stroke buffer at 122. If, however, the pointing device is not moved within a period that exceeds the time delay, a mouse command is recognized and generated at 130. In this example, the user does not pause before pointing device (e.g., the stylus 20) is lifted, and therefore, the stroke is sent to a character recognition unit or gesture recognition unit for processing at 128. If the touch input stroke has not been recognized as either a gesture or character, a mouse command would be generated at 130.

If the input stroke has been recognized by the gesture recognition unit as a circle gesture, the AUI passes the circle gesture signal to the appropriate computer module 132.

There is described below with reference to FIG. 5A and 5B, an operation of the invention to reduce system overhead associated with resetting a delay timer which is used to determine whether a cessation of motion of the pointing device has occurred.

Figure 5A:
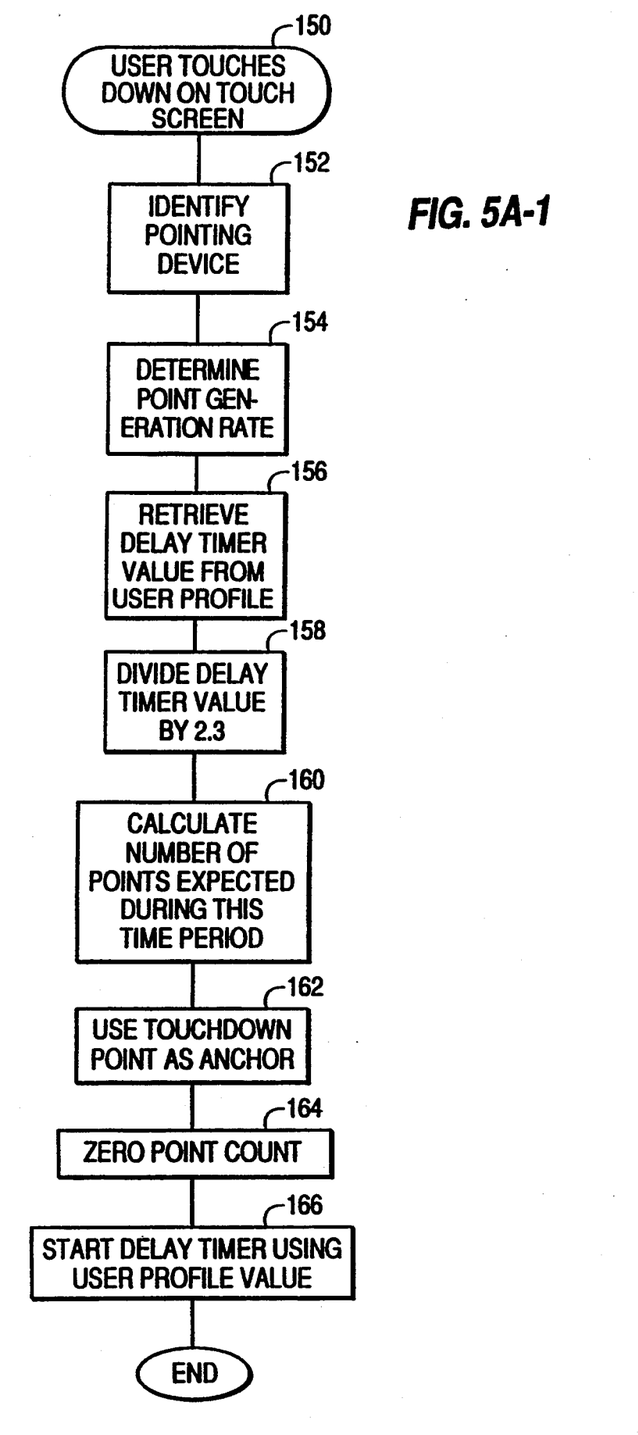
FIG. 5A and 5B are flow diagrams illustrating the operation of the invention in reducing system overhead associated with resetting a delay timer to determine whether a cessation of motion has occurred.
Figure 5A:
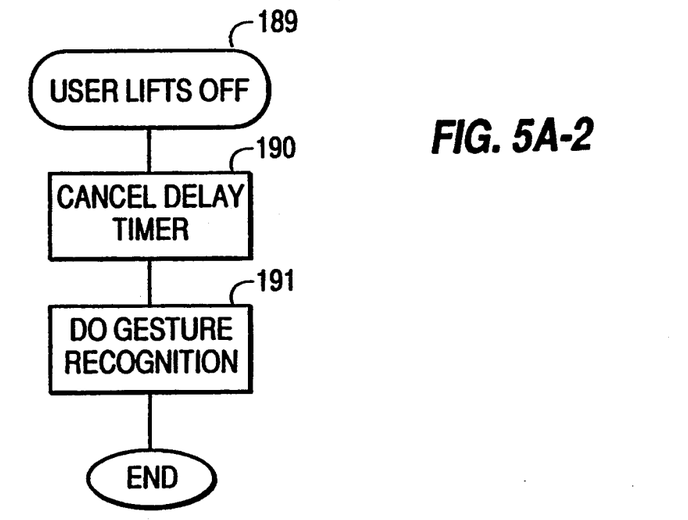
Figure 5A:
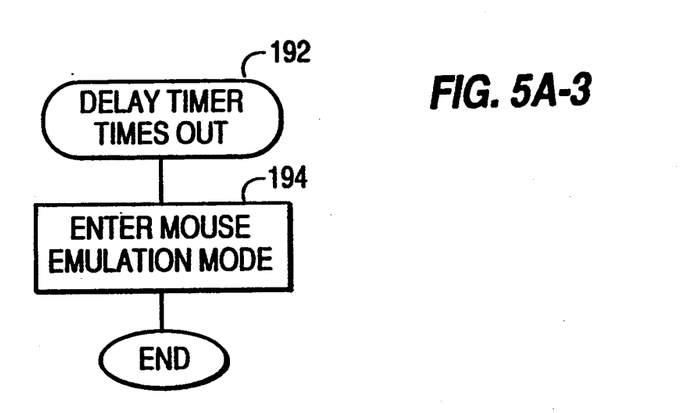

Referring to FIG. 5A, the user first touches a pointing device down on the touch sensor in 150 and generates one point. In 152, after the first point is collected by the AUI, the pointing device that generated that point is identified; that is, the pointing device is identified as a finger, stylus, mouse, etc. In 154, the point generation rate is determined. Each pointing device generates points at different rates. The stylus, for example, generates 110 points per second, whereas the mouse generates 40 points per second. At 156, the system refers to a user profile and retrieves a delay timer value. There is a different delay timer value for each pointing device. For example, the stylus timer delay is 200 ms, whereas the finger timer delay is 300 ms. In 158, the delay timer value is divided by 2.3, an empirically derived constant, to yield 86 ms (i.e., 200 ms divided by 2.3 yields 86 ms). At 160, the number of points expected during this 86 ms period is then calculated. With a stylus generating 110 points per second, there would be approximately 9 input points during the 86 ms period. The system records the touch-down point and uses it as an anchor. The term "anchor" implies that the next point generated by the pointing device must be a predetermined distance from the touch-down point to be considered a movement of the pointing device. The predetermined distance may be varied in accordance with the system resolution. At 164, the point count is zeroed out. As the points are received, they are counted. In 166, the delay timer is started using the retrieved value. At this point, setup initialization is completed.

At 188, the user lifts the pointing device off the touch sensor. If the user lifts off, there will be no mouse emulation detected and the system categorizes the input points generated by the pointing device as a gesture or handwriting input and cancels the timer. In 192, the delay timer times out. The delay timer timed out because the user stopped moving the pointing device for time in excess of the delay period and the system stopped resetting the timer. When that happens, the system enters mouse emulation mode.

Figure 5B:
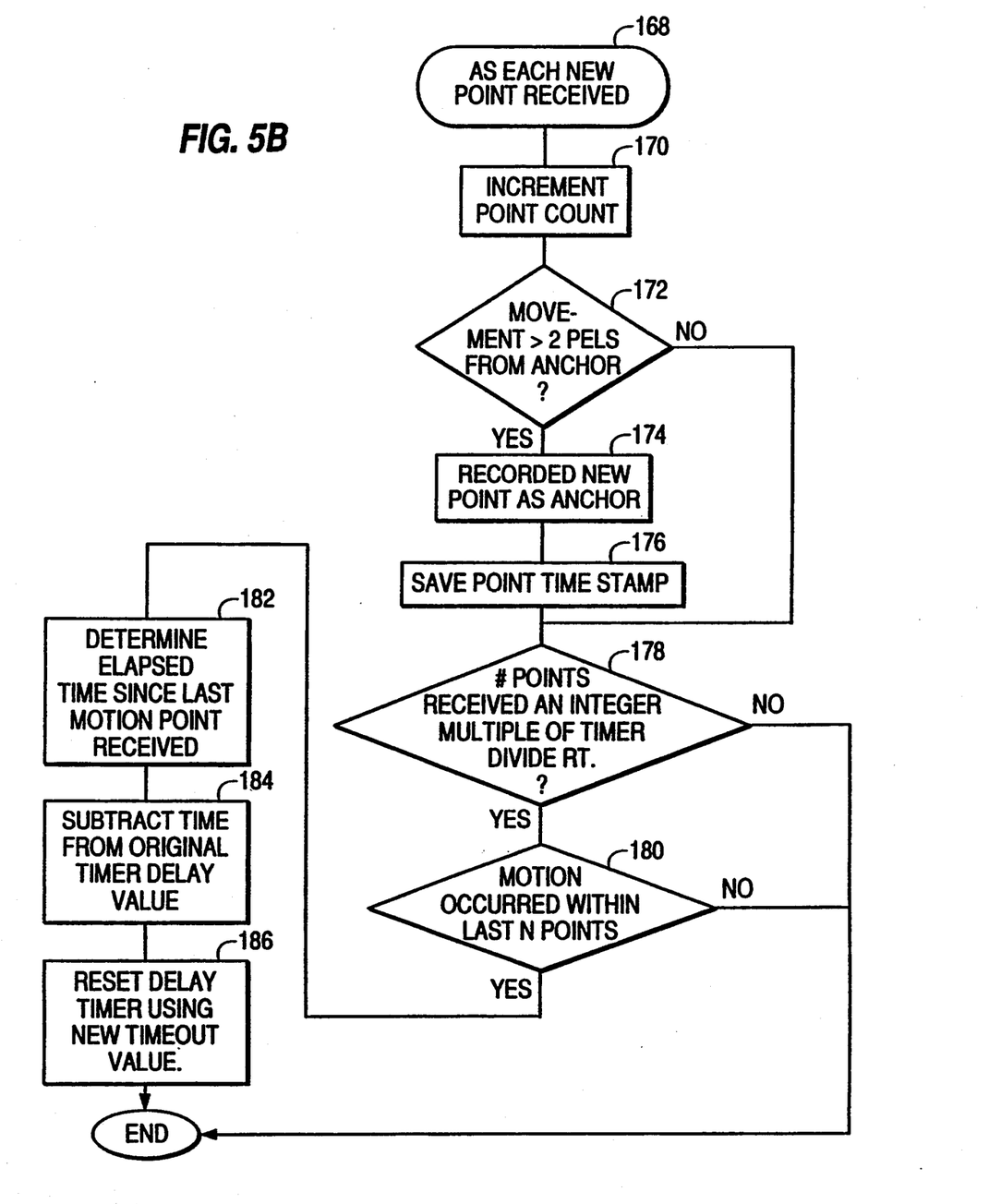

In FIG. 5B, at 168, each new point generated is collected from the touch sensor. For the stylus, the points are received at 110 points per second. At 170, the point count is incremented. At 172, the X–Y coordinates of the newest input point are examined to see if the point is more than two picture elements (pels) from the anchor or the previous input point. If so, the system classifies the pointing device as having movement. In 174, the new point is recorded. The X–Y coordinates are used for the new anchor, and the timestamp of that point is saved. If there is no movement, the last two steps are omitted. At 178, the number of points received up to this time is calculated. If the number is an integer multiple of the divide rate, the system proceeds to 180 to see if motion had occurred within the last n points. ("n" in this case is 9.) The divide rate for the stylus would be 9, so the system would check for multiples of 9 (e.g., 9, 18, 27, etc.). If motion has occurred, the elapsed time is determined from the time the last motion point was received. If there has been any elapsed time since the last motion point, the elapsed time is subtracted from the original timer value, e.g., 200 ms. At 186, the timer delay is reset using the new timeout value which would be 200 ms minus the elapsed time between motion cessation and the nth point. In 178 and 180, if either of those tests resulted in no, the system exits.

Figure 6:
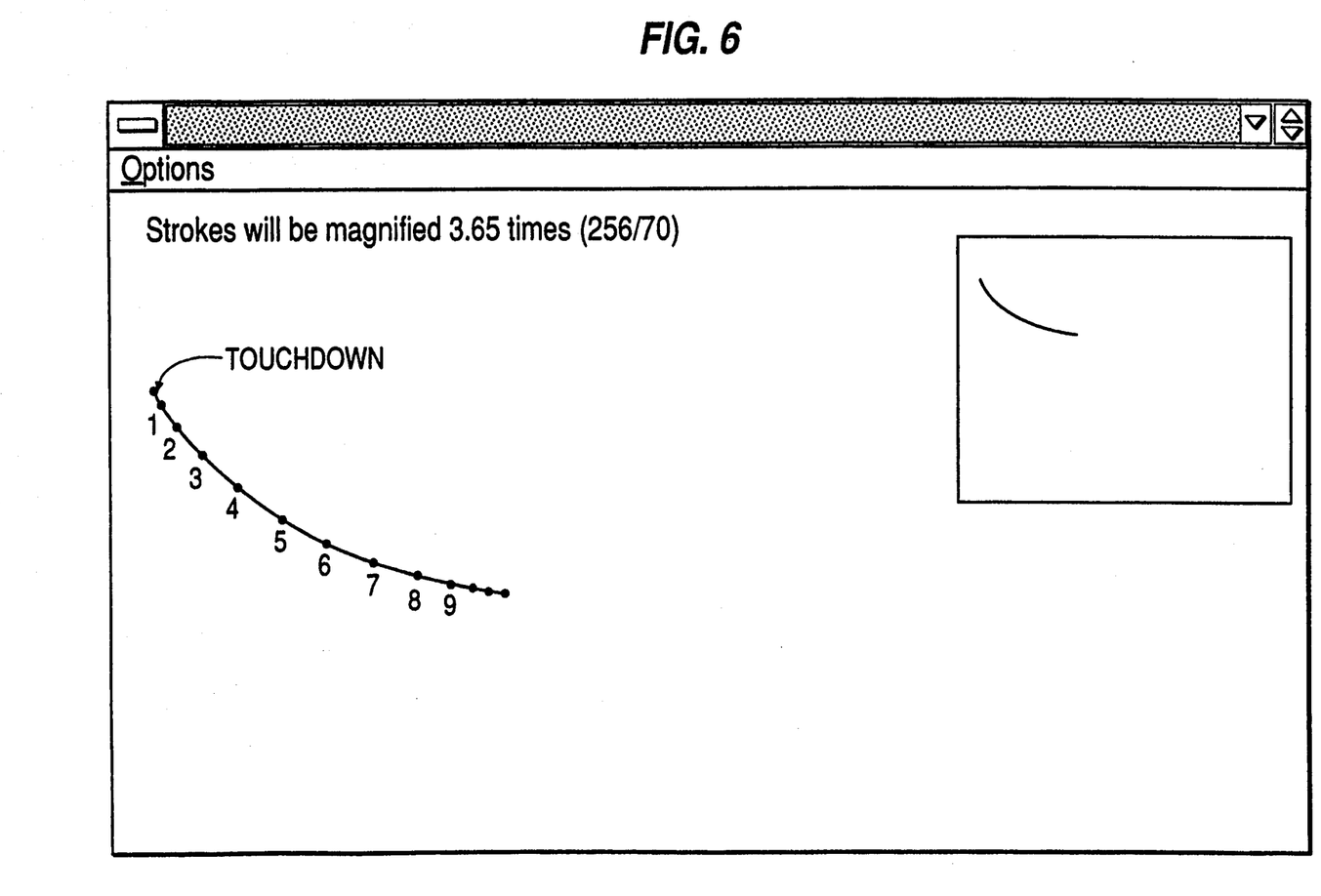
FIGS. 6, 7, and 8 are representations of a window displayed on the touch workpad of FIG. 1 and depicting an inked stroke intended to produce a mouse command.

In FIG. 6, there is shown a stroke consisting of a touch-down and a series of nine (9) points. As discussed previously, after 9 points are received from the stylus, the system checks to see if movement has occurred within the last 9 points. In the figure, the stylus movement has been relatively rapid. In actual use, the points are likely to be spaced more closely together.

In FIG. 6, there has been motion within the last 9 points; the portion of the stroke from point 8 to point 9 has been inked. After the 9th point is received, the delay timer, which is waiting for a period of stability of 200 ms, is reset to zero and resumes waiting for the user to stop moving.

Figure 7:
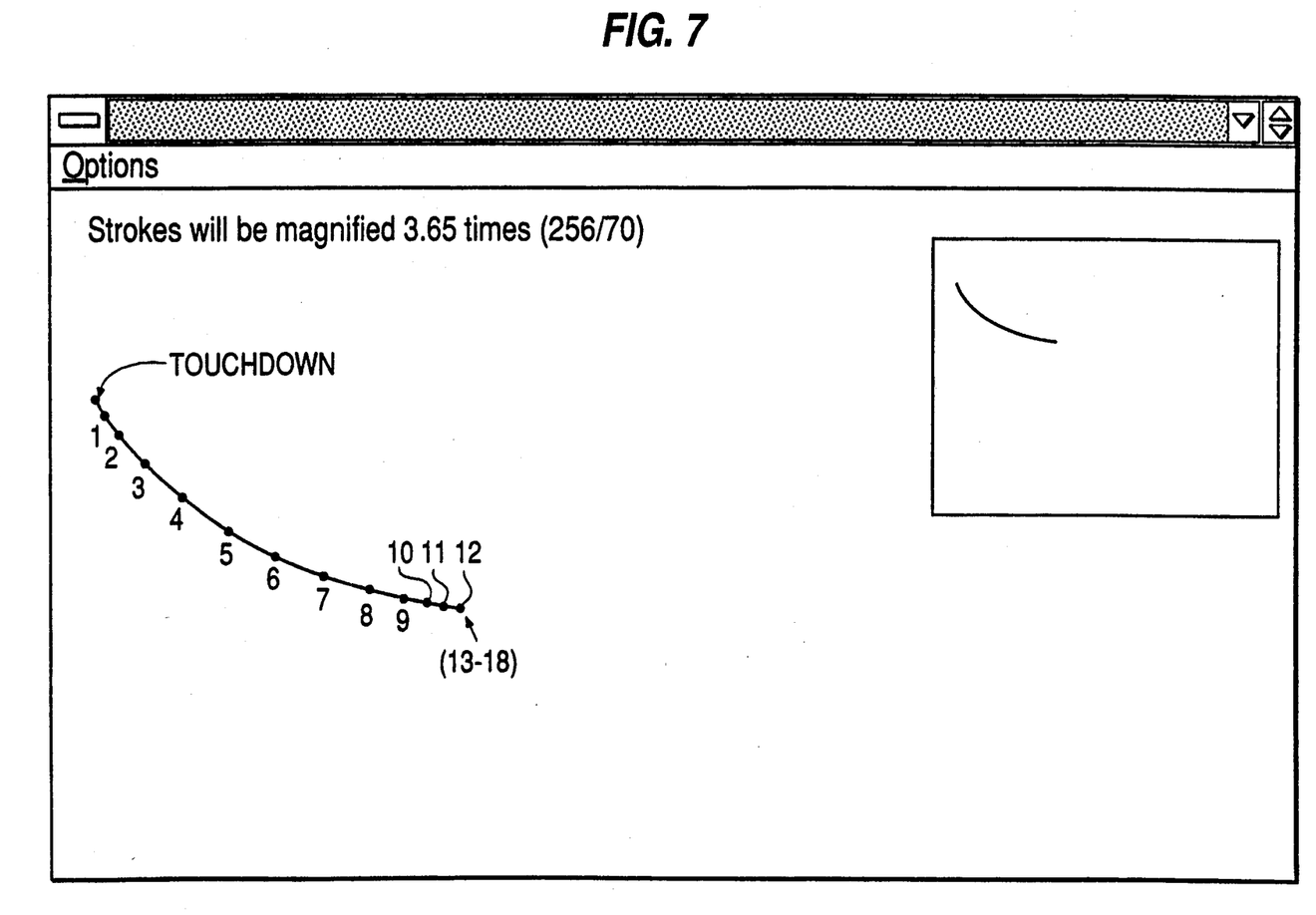

In FIG. 7, the user has continued to move on to points 10, 11 and 12. Points 13–18 are shown in parenthesis. After the user moved to point 12, he held the stylus stationary so that the last 6 points were generated in the same position as the 12th point. At point 18, the system, again, determines if any motion occurred in the previous 9 points. Again, the answer is yes. Motion occurred on the first 3 points (10–12). However, on the last 6 points there was no motion, so the 200 ms timer is reset. To account for the absence of motion for the last 6 points, 54 ms, the timer is reset at the value of 200 ms minus 50 ms which equals 150 ms.

Figure 8:
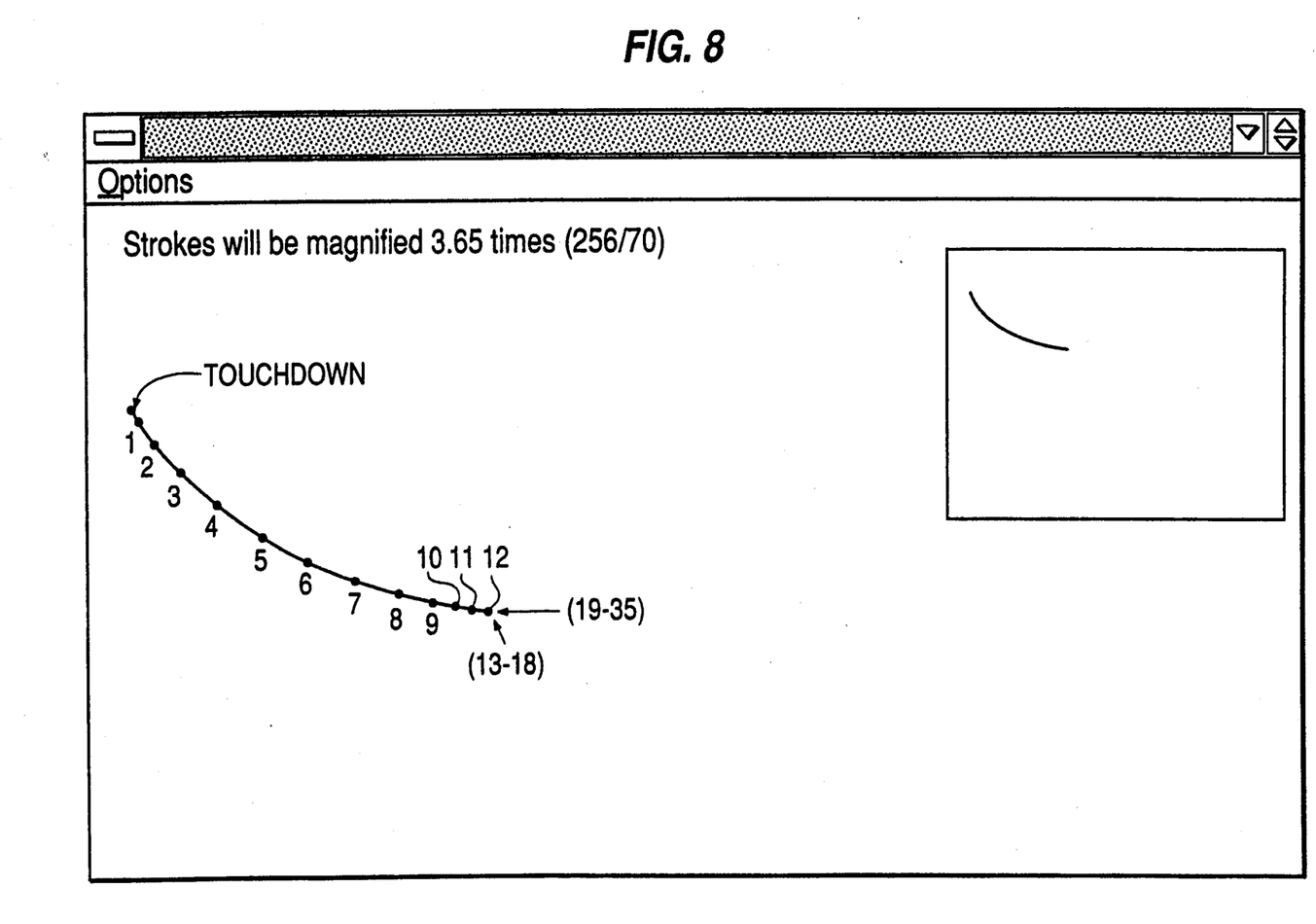

FIG. 8 shows that the user never did again move the stylus. The stylus remained stationary after point 12, and points 19–35 show there was no movement so the timer is never reset. At point 35, a timeout occurred because the user failed to move the pointing device for 200 ms. When the system detects a timeout, mouse emulation mode is entered to cause a mouse command input message to be produced.

The AUI system provides facilities for finger- and stylus-based user interface devices. When used with devices capable of tracking the movement of a user's finger or the movement of a stylus, AUI provides support for the handling of the resulting stroke information. These facilities include the visual tracing on the screen of ink flowing from the stylus, the delivery of the stroke information to application programs, and the delivery of the stroke information to recognition subsystems for further analysis.

AUI employs a user interface technique where mouse emulation for the pointing device (stylus, finger or mouse) is delayed until the user stops moving the pointing device. Any stroke completed (i.e., pointing device is lifted off touch sensor) before movement has stopped is classified as a gesture or handwriting input. After motion stops, it is assumed the user intends to emulate a mouse input, and a mouse emulation mode begins. To effect the detection of motion cessation, the user must touch down and hold the pointing device stationary for a timeout period. "Stationary" is defined as no change in position greater than n pels, where 'n pels' can be expressed in either display or sensor resolution units. In one preferred embodiment, a value of two display pels is used. Examples of typical timeout values are 200 ms for a stylus, 300 ms for finger touch, and 200 ms for a mouse. These values represent a trade-off between minimizing the delay to enter mouse emulation and making gestures easy to stroke without inadvertently timing out during the stroke.

The invention has particular application in a multitasking computer system. As described above, a single task or thread is typically dedicated to managing a delay timer used to determine motion cessation. In the prior art, for example, a stylus pointing device generates 110 points per second, one point every 9 ms. Thus, the prior art processor would need to switch to and from the timer thread every 9 ms when the stylus is in motion. As a result, 100% of the processing time of the system is taken up by managing the timer, assuming the processor takes 9 ms to process data for each point generated.

In accordance with the present invention, this timer thread needs to be reset only every nth point generated by the pointing device used with the computer system. Thus, the system processor does not have to waste processing time to switch between a currently executing thread to the timer thread after each point is generated by a moving pointing device.

To clarify the above description invention, the following pseudocode is provided to detail the logic flow:

```
when a user touches down
    identify stroke device
    determine point rate
    retrieve the delay timer value from user profile
    divide delay timer value by 2.3
    calculate number of points expected during this
        period
    clear point counter
    start delay timer
endwhen
when a new point is received from the sensor
    increment number of points received in the stroke
    if point shows movement greater than 2 pels from
        last motion point, record point and
        timestamp of point
    endif
    if number of stroke points is even multiple of
        time divide rate
        if motion had occurred during last n points
            determine elapsed time since last
                motion point received
            subtract this time from original delay
                timer value
            reset the delay timer using this new
                timeout value
        endif
    endif
endwhen
when user lifts off
    cancel delay timer
endwhen
when delay timeout occurs (asynchronously)
    enter mouse emulation mode
endwhen
```

While the invention has been particularly shown and described with reference to a preferred embodiment thereof, it will be understood by those skilled in the art that various changes in detail may be made therein without departing from the spirit, scope and teaching of the invention. For example, the above embodiment assumed a steady generation of points was made by the pointing device such that the timer used to determine cessation of a moving pointing device could be periodically reset after n points were generated. However, in a system where the movement of the pointing device is sporadic and a steady stream of points are not generated by a moving pointing device, the timer can be reset periodically at timed intervals, e.g., 86 ms, in accordance with the following alternative embodiment of the invention.

In this embodiment, an initial point generated by the pointing device is used as an anchor point (as in the embodiment described above). All subsequent points are then monitored as to their time period of generation (hereinafter referred to as a "timestamp") relative to the anchor point was generated. When a point is generated with a timestamp greater than a given interval of time, e.g., 86 ms, the timer is reset and the point is used as the new anchor point. According to this embodiment of the invention, the timer is periodically reset at given time intervals when points are generated within the predetermined time-delay period, e.g., 200 ms. If no points are generated by the pointing device, and no movement thereof is detected, then a timeout occurs and a the system enters a mouse emulation mode (as described above).

The embodiments presented above are for purposes of example and illustration only and are not to be taken to limit the scope of the invention narrower than the scope of the appended claims.

Having thus described my invention, what I claim as new, and desire to secure by Letters Patent is:

1. A method for reducing the processing time required to recognize the cessation of motion of a moving pointing device in an information processing system, the method comprising the steps of:

determining that a pointing device is located in operative proximity to a display screen, in said information processing system;

generating a series of delay timers having a predetermined rate, while said pointing device is located in said operative proximity to said display screen, in said information processing system;

accessing a predetermined timer divide rate value 'n' from said information processing system, representing a predetermined plurality of 'n' of coordinate point signals, in said information processing system;

receiving a first point signal for said pointing device with respect to said display screen, and buffering said first point signal in a memory as an anchor point and starting a delay timer, in said information processing system;

receiving a plurality of n−1 succeeding point signals for said pointing device with respect to said display screen, and buffering said plurality of n+1 signals, in a memory in said information processing system;

computing whether said pointing device has moved with respect to said display screen by comparing at least one of said buffered plurality of n−1 point signals with said buffered anchor point, in said information processing system;

if said computing step determines that said pointing device has moved, then receiving a second plurality of n succeeding coordinate point signals for said pointing device with respect to said display screen, and buffering a first of said second plurality of n signals as a new anchor point while restarting the delay timer, in said information processing system;

if said computing step determines that said pointing device has not moved, then outputting a first output signal indicating cessation of motion of said pointing device;

if said determining step determines that said pointing device is not located in said operative proximity to said display screen, then outputting a second output signal indicating that said pointing device has been removed from said operative proximity to said display screen.

2. The method as recited in claim 1, which further comprises the steps of:

identifying the pointing device as one among several possible pointing devices; and setting, in accordance with the identified pointing device, said predetermined delay timer value.

3. The method as recited in claim 1, wherein the pointing device is a finger moving across a touch sensor, and further comprising the step of canceling said delay timer when the finger is lifted off the touch sensor.

4. The method as recited in claim 1, wherein the information processing system enters a mouse emulation mode in response to said first output signal.

5. The method as recited in claim 1, further comprising the step of entering a gesture recognition mode when said second output signal is outputted.

6. A method for reducing the processing time required to recognize the cessation of motion of a moving pointing device in an information processing system, the method comprising the steps of:

determining that a pointing device is located in operative proximity to a touch sensor controlling a display screen, in said information processing system;

generating a series of delay timers having a predetermined rate, while said pointing device is located in said operative proximity to said touch sensor, in said information processing system;

accessing a predetermined timer divide rate value 'n' from said information processing system, representing a predetermined plurality of 'n' of coordinate point signals, in said information processing system;

receiving a first point signal for said pointing device with respect to said touch sensor, and buffering said first point signal in a memory as an anchor point and starting a delay timer, in said information processing system;

receiving a plurality of n−1 succeeding coordinate point signals for said pointing device with respect to said touch sensor, and buffering said plurality of n−1 signals, in said memory in said information processing system;

computing whether said pointing device has moved with respect to said touch sensor by comparing at least one of said buffered plurality of n−1 point signals with said buffered anchor point, in said information processing system;

if said computing step determines that said pointing device has moved, then receiving a second plurality of n succeeding coordinate point signals for said pointing device with respect to said touch sensor, and buffering a first of said second plurality of n signals as a new anchor point while restarting the delay timer, in said information processing system;

if said computing step determines that said pointing device has not moved, then outputting a first output signal indicating cessation of motion of said pointing device; if said determining step determines that said pointing device is not located in said operative proximity to said touch sensor, then outputting a second output signal indicating that said pointing device has been removed from said operative proximity to said touch sensor.

7. The method as recited in claim 6, further comprising the step of identifying a type of said pointing device wherein said predetermined delay timer value is determined in accordance with the type identified.

8. The method recited in claim 6, wherein when motion of said pointing device has not been detected within a number of previous position points, said predetermined delay timer value is reduced in accordance with the number of previous position points.

9. The method recited in claim 6, wherein the system accepts information from said pointing device as gesture or character information in response to movement and removal of said pointing device from said touch sensor.

10. The method as recited in claim 6, further comprising the step of entering a gesture recognition mode when said second output signal is outputted.

11. A method for reducing the processing time required in a multi-tasking information processing system, to recognize the cessation of motion of a moving first pointing device that emulates a second pointing device in the system, the method comprising the steps of:
    determining that a first pointing device is located in operative proximity to a display screen, in said information processing system;
    generating a series of delay timers having a predetermined rate, while said pointing device is located in said operative proximity to said display screen, in said information processing system;
    accessing a predetermined timer divide rate value 'n' from said information processing system, representing a predetermined plurality of 'n' of coordinate point signals, in said information processing system;
    receiving a first point signal for said pointing device with respect to said display screen, and buffering said first point signal in a memory as an anchor point and starting a delay timer, in said information processing system;
    receiving a plurality of n−1 succeeding point signals for said pointing device with respect to said display screen, and buffering said plurality of n−1 signals, in said memory in said information processing system;
    computing whether said pointing device has moved with respect to said display screen by comparing at least one of said buffered plurality of n−1 point signals with said buffered anchor point, in said information processing system;
    if said computing step determines that said pointing device has moved, then receiving a second plurality of n succeeding coordinate point signals for said pointing device with respect to said display screen, and buffering a first of said second plurality of n signals as a new anchor point while restarting the delay timer, in said information processing system;
    if said computing step determines that said first pointing device has not moved, then outputting a first output signal indicating cessation of motion of said first pointing device and designating it as said second pointing device;
    if said determining step determines that said first pointing device is not located in said operative proximity to said display screen, then outputting a second output signal indicating that said first pointing device has been removed from said operative proximity to said display screen.

12. A data processing system for reducing the processing time required to recognize the cessation of motion of a moving pointing device, comprising:
    means for determining that a pointing device is located in operative proximity to a touch sensor controlling a display screen, in said data processing system;
    means for generating a series of delay timers having a predetermined rate, while said pointing device is located in said operative proximity to said touch sensor, in said data processing system;
    means for accessing a predetermined timer divide rate value 'n' from said information processing system, representing a predetermined plurality of 'n' of coordinate point signals, in said data processing system;
    means for receiving a first point signal for said pointing device with respect to said touch sensor, and buffering said first point signal in a memory as an anchor point and starting a delay timer, in said data processing system;
    said receiving means receiving a plurality of n−1 succeeding point signals for said pointing device with respect to said touch sensor, and buffering said plurality of n−1 signals, in a memory in said data processing system;
    means for computing whether said pointing device has moved with respect to said touch sensor by comparing at least one of said buffered plurality of n−1 point signals with said buffered anchor point, in said data processing system;
    if said computing step determines that said pointing device has moved, then receiving a second plurality of n succeeding coordinate point signals for said pointing device with respect to said touch sensor, and buffering a first of said second plurality of n signals as a new anchor point while restarting the delay timer, in said data processing system;
    if said computing means determines that said pointing device has not moved, then said computing means outputs a first output signal indicating cessation of motion of said pointing device;
    if said determining means determines that said pointing device is not located in said operative proximity to said touch sensor, then said computing means outputs a second output signal indicating that said pointing device has been removed from said operative proximity to said touch sensor.

13. The data processing system recited in claim 12, wherein the system accepts information from said pointing device as mouse input data in response to a recognition of motion cessation.

14. The data processing system recited in claim 12, wherein said touch sensor is a touch-sensitive display screen that displays information under control of said pointing device.

15. The data processing system recited in claim 12, wherein the system is a multi-tasking computer system that dedicates a single task to managing said computing by said computing means.

16. The data processing system recited in claim 12, wherein the system enters a gesture recognition mode when said second output signal is outputted.

* * * * *